Patented Oct. 28, 1952

2,615,910

UNITED STATES PATENT OFFICE 2,615,910

PRODUCTION OF SYNTHETIC HYDROCARBONS

Harry E. Cier, Crosby, Tex., assignor, by mesne assignments, to Standard Oil Development Company, Elizabeth, N. J., a corporation of New Jersey No Drawing. Application October 29, 1948, Serial No. 57,403

4 Claims. (Cl. 260—449.6)

The present invention is directed to an improved method for effecting the synthesis of hydrocarbons and oxygenated organic compounds from carbon monoxide and hydrogen. More particularly, the invention relates to a process for producing hydrocarbons and oxygenated organic compounds from carbon monoxide and hydrogen employing a catalyst comprising an iron compound.

This application is a continuation-in-part of U. S. Serial No. 725,968, filed February 1, 1947, now abandoned, and entitled "Synthetic Production of Hydrocarbons."

It is well known to the art to produce hydrocarbons by the reaction of carbon monoxide and hydrogen in the presence of iron and other catalysts and under well defined conditions of temperature, pressure, and contact time, these conditions being adjusted for the particular type of catalyst being employed. The products obtained by the reaction of carbon monoxide and hydrogen also vary in type, configuration, and molecular weight, depending upon the type of catalyst employed. Paraffinic and olefinic hydrocarbons are the usual products obtained in a reaction of this type but higher boiling hydrocarbons including the waxy hydrocarbons may also be produced. By-products may consist chiefly of water, oxygenated compounds and unreacted gas. Experience has shown that the oxygenated compounds are predominately alcoholic in nature and small amounts of esters of organic acids, organic acids, ketones and aldehydes are usually also formed.

It has been the practice by the prior art workers to condition or treat the catalyst and especially the iron type catalyst before it is rendered suitable for employment in the synthesis of hydrocarbons from carbon monoxide and hydrogen. It has been customary to oxidize and to reduce the catalyst prior to passing the synthesis gas mixture over the catalyst at the conditions employed in the synthesis. The oxidation has usually been carried out by employing air or other oxygen-containing gas at a temperature of about 1000° F. for periods of time of about 4 hours and upwards, followed by treating the oxidized catalyst further with hydrogen at a temperature of about 700° F. to about 1400° F. at an atmospheric pressure for about 24 hours.

The prior art workers have also disclosed treatment of iron type catalyst with the synthesis gas itself. The earlier workers in this field have treated iron type catalyst with synthesis gas under pressures lower than the synthesis operating pressure, following which the pressure is raised and the synthesis of hydrocarbons commenced. The prior art workers reduced their catalyst at temperatures in the range employed in the synthesis operation. The catalyst employed by these workers in their reduction operation required an induction period which may range upward to 24 hours before optimum amounts of hydrocarbons and the desirable oxygenated compounds are produced. It will be apparent that the prior art methods have serious economic disadvantages since considerable operating time is lost before the desired products are produced.

It is therefore an object of the present invention to provide a method of pretreating iron type catalyst so that the synthesis operation may allow obtaining the desired product nearly immediately.

Another object of the present invention is to produce improved yields of hydrocarbons from carbon monoxide and hydrogen over that obtainable heretofore.

The objects of the present invention are obtained by pretreating the iron type catalyst at superatmospheric pressures with a synthesis gas comprised of carbon monoxide and hydrogen at a temperature above active synthesis temperatures but below temperatures at which excessive coke formation occurs.

Briefly, the present invention may be described as involving the treatment of an iron type catalyst such as ferro-ferric oxide with a mixture of carbon monoxide and hydrogen at a temperature in the range of 650° to 750° F. for 0.5 to 12 hours, following which the temperature is reduced to a temperature in the range of 400 to 600° F. under which conditions synthesis of hydrocarbons and oxygenated compounds is effected.

It is preferable, in the practice of the present invention, that the reducing operation be conducted at a temperature no greater than 750° F. If the reduction operation were conducted at a temperature above this temperature, rapid carburization of the catalyst occurs and the beneficial results of the invention are obviated.

The pressures employed in the pretreating operation may be the pressures employed in the synthesis operation and may range from about 0 to 450 p. s. i. g. For example, a pressure of 150 p. s. i. g. has been found to be suitable both in pretreating and in the synthesis steps. Under some conditions it may be desirable to employ one pressure in the pretreating step and another pressure in the synthesis step. If the pressures employed in the pretreating step are different from the pressures employed in the synthesis step, the pressure will still be in the range of the 0 to 450 p. s. i. g. For example, it may be desirable to employ a low pressure in the pretreating step and a higher pressure in the synthesis step. Under some conditions the reverse may be true.

The time required for the pretreating step may range from about thirty minutes up to about twelve hours but preferably is in the range of one to eight hours. Very good results are obtained by pretreating a catalyst according to the present invention for about one hour as will be described.

The type of catalyst lending itself to reduction in accordance with the present invention will include, in general, the iron type catalysts such as alpha and gamma iron oxide, ferro-ferric oxide, and metallic iron itself, provided it is suitably oxidized prior to the reduction operation of the present invention.

It is generally desirable to employ with the iron type catalyst various promoting agents. For example, of the promoters which may be suitable in the practice of the present invention may be mentioned the oxides and salts of the alkali metals. Potassium oxide gives good results when employed as a promoting agent in the catalyst treated in accordance with the present invention. Other promoting agents have been disclosed in the literature but since they do not fall within the province of my invention will not be referred to specifically herein. Suffice to say that a sufficient quantity of a promoter of the type generally mentioned above should be employed with the iron catalyst treated in accordance with the present invention. These promoters may range in amounts from about 0.2 to 20% by weight of the catalyst mass.

The temperature employed in pretreating the catalyst to condition or activate it for the reaction will generally be in the range of about 50 to 200° F. above the desired operating temperature level. After the catalyst has been conditioned or activated, the temperature is lowered to the desired operating level and synthesis of hydrocarbons and oxygenated compounds is obtained from the feed gas.

As a specific example of the practice of the present invention, a sample of co-precipitated ferro-ferric oxide promoted with 10% $K_2O$ (added as $K_2CO_3$) was reduced at 900° F. with 1000 volumes of hydrogen per volume of catalyst per hour for 4 hours at atmospheric pressure. The temperature of the catalyst was then reduced to 600° F. and a synthesis gas made up of carbon monoxide and hydrogen in the ratio of 1:1 was then passed over the catalyst at a rate of 200 volumes per volume of catalyst per hour at an operating pressure of 150 p. s. i. g. Under these operating conditions the catalyst activity was low; the $CO_2$ content of the exit gas from the reactor after 100 hours of operation was only 18%, indicating a low conversion of the order of 50% of carbon monoxide to useful products; actually the amount of useful products produced was not measurable as a liquid. The temperature was then increased to 650° F. while still passing the synthesis gas mixture over the catalyst at this temperature. This operation at 650° F. corresponded to a pretreating operation for the catalyst which had been demonstrated to be inactive when employed in synthesizing hydrocarbons at 600° F. as described above. After 8 hours of operation at 650° F. a residue gas sample was analyzed and found to contain 45% carbon dioxide. From then on the carbon dioxide content of the residue gas remained at a high level, indicating that the catalyst had been conditioned properly by contact with the synthesis feed gas at 650° F. and useful products were being produced. A run was then made at 600° F. and then the temperature was reduced to 550° F. for a run at the lower temperature.

The pertinent data obtained from these runs are presented in the following table:

| Operating temperature, ° F | 650 | 600 | 550 |
|---|---|---|---|
| Percent CO conversion | 96.5 | 95 | 88.5 |
| Percent $CO_2$ in residue gas | 49 | 51 | 41 |
| Yield, $C_4$ and heavier hydrocarbons, cc. per cu. meter of $H_2$+CO consumed (output basis) | 115 | 200 | 190 |

These data indicate that the catalyst was not properly activated after 100 hours of operation at 600° F. mentioned in the run where the carbon dioxide content of the exit gas was only 18% even with pretreatment with hydrogen at 900° F. prior to the synthesis operation. By increasing the temperature to 650° F., a high conversion of carbon monoxide was obtained following which, when the temperature was again lowered to 600° F., high carbon monoxide conversions with high liquid yields were indicated. The data on yields of $C_4$ and heavier hydrocarbons at 600° and 550° F. after treatment of the catalyst in accordance with the present invention may be compared with the yield obtained at 650° F. in conventional operations where the catalyst had been pretreated with hydrogen at 900° F. It will be readily apparent that at 600° F. and 550° F. the yield has been increased, respectively, by approximately 74% and 65% which is quite substantial. Furthermore, while not shown by the data, by proceeding in accordance with the present invention, the induction period required before commercial quantities of hydrocarbons are produced has been considerably shortened over that obtainable heretofore.

In another specific operation according to the present invention, iron oxide catalyst to which has been added 2% by weight based on the catalyst of potassium carbonate was divided into two parts. One part was pretreated according to the present invention by passing a mixture of equal parts of hydrogen and carbon monoxide in contact with the catalyst for one hour at a temperature ranging from 650 to 730° F. at a pressure of 0 p. s. i. g. The other part was treated conventionally by contact with hydrogen for four hours at 900° F.

After the two portions of catalyst were treated as described above, they were then employed to synthesize hydrocarbons and oxygenated organic compounds employing a gaseous feed mixture of equal parts of carbon monoxide and hydrogen. The synthesis gas mixture was contacted with the catalyst, which had been pretreated as described above, at a feed rate of 200 volumes of feed gas per volume of catalyst per hour at a temperature of 550° F. and 150 p. s. i. g.

The yields of hydrocarbons having four or more carbon atoms in the molecule are presented in the following table, the data in the left hand column being the results obtained in the present invention where the catalyst was pretreated according to my improved techniques while the results in the right hand column represent the conventional method.

| Days' operation | Yield, C₄ and Heavier Hydrocarbons, cc. per cubic meter of H₂ and CO consumed | |
| --- | --- | --- |
| | Present Invention | Conventional |
| 1 | 125 | 67 |
| 2 | 220 | 75 |
| 3 | 170 | 165 |
| 4 | 170 | 160 |
| 5 | 144 | 75 |
| 6 | 190 | 165 |
| 7 | 210 | 70 |
| 8 | 175 | 145 |
| 9 | 160 | 145 |
| 10 | 175 | 120 |
| 11 | 155 | 135 |
| Average | 172 | 120 |

It will be noted from the data in the foregoing table that the present invention allows the production of substantially improved results when the catalyst is pretreated in accordance with my invention over that obtained by conventional pretreating operations. It will be noted that in every instance substantially greater yields are obtained in my invention over an 11-day operating period than was obtained in the conventional operation, the average of the 11-day period representing an improvement of about 43% for the present invention in yields of useful hydrocarbons. It will also be noted that the induction period required before commercial quantities, i. e. above 100 cc. of useful hydrocarbons per cubic meter of feed gas consumed, of useful products were produced was about two days in the case of the conventional operation and less than one day in the practice of the present invention.

The invention has been described by reference to the employment of synthesis gas in the ratio of equal volumes of carbon monoxide to hydrogen. It is to be understood, of course, that synthesis gas of other ratios between 1:1 and 2:1 of carbon monoxide to hydrogen are satisfactory both in the pretreating operation and the actual synthesis operation.

The catalyst pretreated and employed in the practice of the present invention has been described as an iron type catalyst but it is understood that iron type catalyst may be supported on other types of materials in lieu of the particles alone. For example, the oxides of iron mentioned above may be deposited on carriers such as manganese, silica gel, magnesium compounds and the like.

The present invention may be used with the catalyst employed either as a fixed bed or in a fluidized powder technique where the catalyst is suspended in the reacting gases. If a fixed bed operation is used, it may be desirable to provide a plurality of catalyst cases containing the catalyst. If either the fixed bed or a fluidized powder technique is used, the pretreating operation will represent only a small portion of the operating time since the catalyst may be pretreated for substantially shorter periods of time than was possible heretofore while obtaining substantially improved results.

The nature and objects of the present invention having been fully described and illustrated, what I wish to claim as new and useful and to secure by Letters Patent is:

1. A method for producing hydrocarbons and oxygenated organic compounds including the steps of contacting an oxidized iron-type catalyst free from carbonaceous material with a gaseous mixture of carbon monoxide and hydrogen at a temperature in the range between 650° and 750° F. for a time in the range between 30 minutes and 12 hours and then reducing the temperature 50° to 200° F. to form a product comprising a substantial amount of hydrocarbons and oxygenated organic compounds.

2. A method for producing hydrocarbons and oxygenated organic compounds including the steps of contacting an oxidized iron-type catalyst free from carbonaceous material with a gaseous mixture of carbon monoxide and hydrogen at a pressure in the range between 0 to 450 p. s. i. g. and at a temperature between from 650 and 750° F. for a time in the range between 30 minutes and 12 hours and then reducing the temperature 50° to 200° F. to form a product comprising a substantial amount of hydrocarbons and oxygenated organic compounds.

3. A method for producing hydrocarbons and oxygenated organic compounds including the steps of contacting an oxidized iron-type catalyst free from carbonaceous material with a gaseous mixture of carbon monoxide and hydrogen at a pressure in the range between 0 to 450 p. s. i. g. and a temperature in the range between 650 and 750° F. for a period of time in the range between 1 and 8 hours, and then reducing the temperature to a temperature in the range between 400° and 600° F. to form a product comprising a substantial amount of hydrocarbons and oxygenated organic compounds, and recovering the product.

4. A method for producing hydrocarbon and oxygenated organic compounds including the steps of contacting an oxidized iron-type catalyst free from carbonaceous material with a gaseous mixture of carbon monoxide and hydrogen at a pressure in the range between 0 to 450 p. s. i. g. at a temperature in the range between 650 and 750° F. for a period of time in the range between one and eight hours, and then reducing the temperature to a temperature in the range between 400 and 600° F. while maintaining the pressure in the range between 0 to 450 p. s. i. g. to form a product comprising a substantial amount of hydrocarbon and oxygenated compounds, and recovering the product.

HARRY E. CIER.

REFERENCES CITED

The following references are of record in the file of this patent:

UNITED STATES PATENTS

| Number | Name | Date |
| --- | --- | --- |
| 2,234,246 | Groombridge | Mar. 11, 1941 |
| 2,360,787 | Murphree | Oct. 17, 1944 |
| 2,369,548 | Elian | Feb. 13, 1945 |
| 2,445,796 | Millendorf | July 27, 1948 |
| 2,451,879 | Scharmann | Oct. 19, 1948 |
| 2,479,999 | Clark | Aug. 23, 1949 |